INVENTOR.
Anthony Sabatino
BY Pendleton, Neuman, Seibold & Williams
Attorneys

United States Patent Office 3,298,870
Patented Jan. 17, 1967

3,298,870
BATTERY CASING CONSTRUCTION
Anthony Sabatino, Milwaukee, Wis., assignor to Globe-Union Inc., Milwaukee, Wis., a corporation of Delaware
Filed May 6, 1964, Ser. No. 365,404
5 Claims. (Cl. 136—170)

This invention relates to electric storage batteries and more particularly to storage batteries in which a one-piece cover is secured to the casing of the battery.

In the construction of such batteries, the covers must be secured to the casing in such a manner as to seal the interior of the casing from leakage of the electrolyte between the cell compartments. In addition, the cover must be sufficiently secured to the casing to provide a rigid assembly.

It has been customary in the prior art to employ a separate cover for each cell and then fill the interstices between the covers with a plastic sealant material, such as asphalt sealing compound or rubber modified compounds, which are generally referred to hereinafter as battery compounds. Such battery compounds may be modified in any of several ways to improve their properties. They generally exhibit relatively low adhesion and are not generally preferred as cements.

In the earlier one-piece cover assemblages, battery covers have usually been provided with channels, grooves or recesses to receive the end portions of vertical walls defining the periphery of the battery as well as different cells in the casing body. A substantial bead of cement is customarily applied to the channels of the cover before the cover and the casing body are assembled together to form a completed battery casing. Epoxy resins constitute one type of cement which has been used for securing the cover and casing together. The present invention represents an improvement over that structure in providing an inexpensive seal or gasket formed in situ from a plastic sealant between the casing body and the cover with a substantially continuous film of cement to tenaciously hold the body and cover together and maintain the integrity of the plastic sealant.

The use of plastic sealant materials as in situ gaskets has not been appreciated heretofore, because the cold-flow properties and the poor cohesive strength of such materials generally result in degradation of the seal between the casing and cover when the sealing material is subjected to wide variations in ambient temperature and such stresses as are ordinarily encountered during the life of the battery. Thus, seals of a plastic material such as the typical asphaltic battery compounds, because of low cohesive properties of such compounds, permit relative movement of the casing body and cover. Thus, the cover may rise relative to the casing body resulting in leakage between the body and cover. Accordingly, it is desirable to provide a battery construction employing low cost thermoplastic material for the seal between the cover and the casing body, but in which an auxiliary seal is formed and a tenacious bond created to withstand the stresses encountered during the life of the battery. The adjective "plastic" as used herein does not refer to the familiar organic "plastics" but is used to designate a large class of compounds which are "plastic," "pliable," or "pliant" at room temperatures. These generally cost a small fraction of the cost of epoxy cements or the like.

Battery constructions utilizing one-piece covers have heretofore exhibited a slight gap between the facing edges of the exterior walls of the casing body and cover. Water, battery acid, and other foreign matter may accumulate in this gap, which is undesirable. Because the gap is frequently of capillary dimensions, it is difficult to purge of such contaminants. In accordance with the present invention, this gap is filled and sealed.

The present invention contemplates the use of plastic sealant material to form seals or gaskets between the upper portions of the cell-defining walls of the casing body and the channels in the cover with which such portions engage. In addition to the plastic seal, a bond and auxiliary seal of a setting cement such as a thermosetting epoxy or the like is provided around the periphery of the casing. The epoxy cement functions to hold the outer portions of the cover and casing together and to relieve the plastic sealant from most of the stresses which may be applied between cover and casing during the life of the battery. By this means, the battery construction is rendered less expensive and the manufacturing processes are simplified and expedited while at the same time the quality of the seal and bond between the casing body and cover are improved.

Accordingly, it is an object of the present invention to provide an improved low cost seal and bond between a battery casing body and cover.

Another object of the present invention is to provide a battery construction employing plastic material as a seal or gasket between the casing body and the cover, with means for providing an auxiliary seal and tenacious bond between body and cover, protecting the plastic material from undue stresses.

A further object of the present invention is to provide a battery construction in which the gap between facing edges of the cover and casing body is sealed and filled.

Another object of the present invention is to provide a novel and improved method of manufacturing such a battery construction.

These and other objects and advantages of the present invention will become manifest on an examination of this description and the accompanying claims and drawing.

Reference will now be made to the accompanying drawing, in which.

Figure 1:
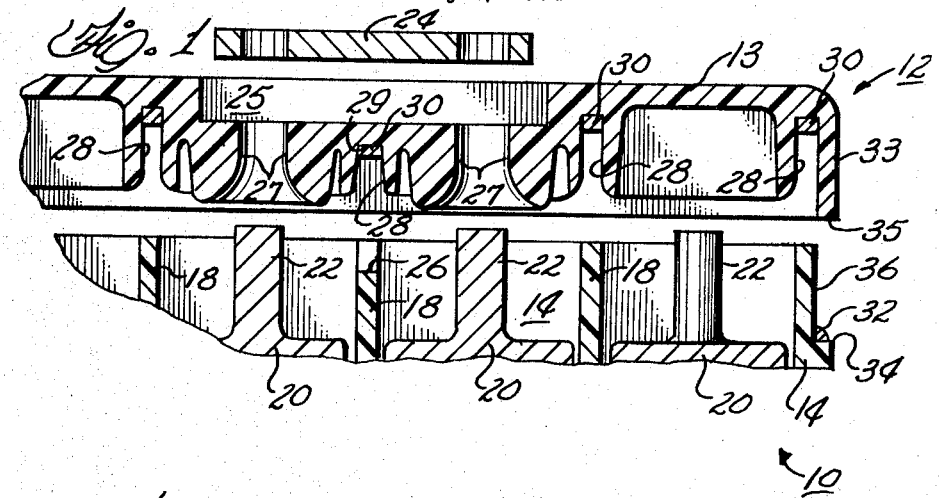
FIG. 1 is an exploded vertical section through a portion of a battery incorporating the present invention.
Figure 2:
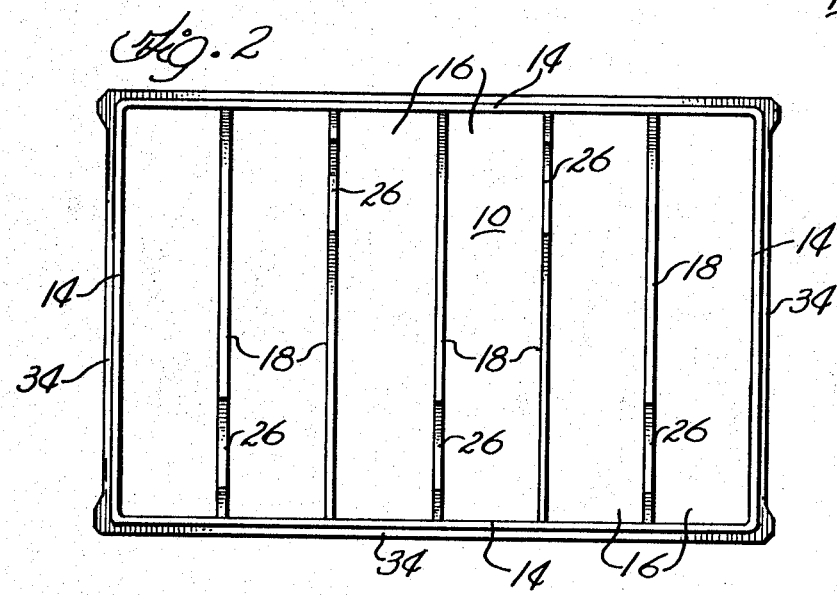
FIG. 2 is a plan view of the casing body of FIG. 1.

In FIG. 1 a battery casing body 10 is shown separately from a casing cover 12, to illustrate the condition of the component parts of the battery casing prior to assembly. The casing body 10 has a number of vertically disposed walls 14 and 18 which are interconnected with a base 16, to form a plurality of battery cells. The outside walls 14 of the casing body 10 define the outside walls of each of the cells and the intermediate walls 18 are the intercell partitions, which separate adjacent cells from each other. Each cell is provided with an assembly of battery electrodes 20 illustrated schematically in FIG. 1.

Each electrode assembly 20 is provided with a pair of terminal posts 22, which are the positive and negative terminals for each cell. The electrode assemblies 20 of the several cells are electrically connected in series by link members 24 and the two endmost terminal posts 22 are connected to external terminals (not shown).

The link members 24 are adapted to fit in recesses 25 disposed in the upper surface of the cover 12. A pair of bores 27 extend through the cover 12 and open into the recess 25. The bores 27 are adapted to receive the terminal posts 22, and when the cover 12 is brought into engagement with the casing body 10, the upper ends of the terminal posts 22 project into the recess 25 and are engaged by the link 24. Preferably, the terminal posts 22 are burned in or welded to the link 24, by which a good mechanical and electrical connection is assured. In an alternate improved battery construction, the intercell connectors pass directly through the intermediate wall eliminating the need for intermediate posts or links. In such a construction, only the end terminals pass through the cover and require seals.

The upper free edges of the cell-separating interior walls 18 are provided with notches 26 which are occupied by the depressed portion 29 of the cover 12 which defines the recess 25.

The cover member 12 is provided with a plurality of channels 28 which are arranged to receive and engage with the top edges of each of the vertical walls 14 and 18 of the casing body 10. The channels are flared outwardly in the nature of a funnel or guide to facilitate entry of the edges of the vertical walls 14 and 18 into nesting relationship therewith.

The portion of a channel or groove 28 which is opposite a notch 26 in an interior wall 18 is disposed beneath the recess 25, and is formed to mate with the wall 18 and its notch 26, so that after the cover 12 is connected to the casing body 10, the entire upper portion of the wall 18 is in engagement with a groove 28, including the edges of the notch 26.

Prior to assembly of the casing body 10 and the cover 12, a fillet 32 of a settable or curable material, such as epoxy or the like, is disposed on a ledge 34 defined by a cut-back portion 36 extending around the periphery of the outer walls 14 of the casing body. A rim or peripheral wall 33 extends around the periphery of the cover 12, and is adapted to overlap the cut-back portion 36 of the wall 14, after assembly. A quantity 30 of plastic battery compound is placed in the channels 28. When placed in channels 28, the battery compound is in a liquid or flowable condition which is brought about by elevating its temperature, as more fully discussed hereinafter.

As the cover 12 is assembled on the casing 10, the epoxy cement 32 is squeezed between the edge 35 of the peripheral wall 33 and the ledge 34 to form a substantially continuous thin film therebetween, and, when cured, bonds them to each other. The plastic sealant material 30 is squeezed in the grooves 28 by the upper edges of the walls 14 and 18, and when cool forms a seal or pliable gasket between the walls 14 and 18 and the cover 12. The epoxy material 32 forms a tenacious bond between the casing body 10 and the cover 12, augmented somewhat by the cohesion of the plastic sealant material 30.

After the casing body 10 and the cover 12 are assembled, the plastic sealant material 30 seals the several cells of the battery and forms a limited bond between the cover and body. When the cover 12 and the casing body 10 are brought together so that the walls 14 and 18 mate with the channels 28, the battery compound 30 is squeezed between the edge of the walls 14 and 18 and the sides of the channels 28, thereby holding the cover 12 and casing body 10 together. After the cover 12 is assembled in this manner, the battery compound 30 forms a seal which prevents leakage of electrolyte from occurring between adjacent cells or to the exterior of the battery.

Figure 3:
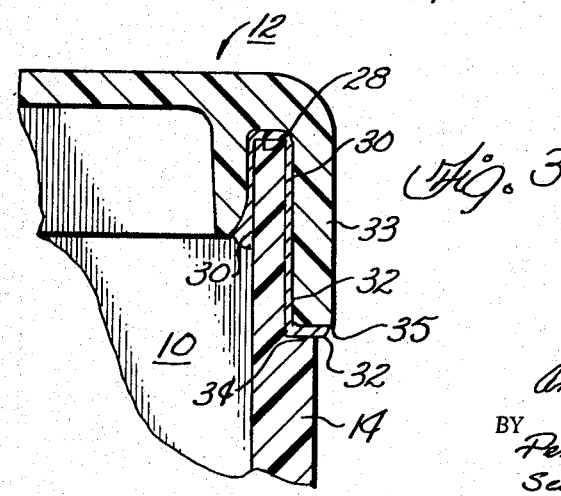
FIG. 3 is an enlarged vertical section of a portion of the battery of FIG. 1, showing the cover, casing body, gasket, and cement bond in assembled relationship.

Referring to FIG. 3, the configuration of one portion of the joint between the cover 12 and casing body 10, after assembly thereof, is illustrated. Some of the plastic material 30 has spread to the outermost portions of the channel upon the insertion of the upper edge of the wall 14. The setting material 32 has also spread between the wall 14 and the peripheral wall 33 of the cover 12 to form a film which secures the parts together and seals the gap between the ledge 34 and the edge 35.

The thermosetting material 32 requires curing before it hardens to full strength. The curing takes place relatively rapidly at an elevated temperature, but room temperature curing is preferable, which takes somewhat longer. The plastic material 30 is adequate to initially maintain the seal and bond between the casing body 10 and the cover 12 while the cement 32 is curing. Therefore, no special precautions need be taken during subsequent steps in the manufacture of the battery to protect it from stresses.

As has been discussed above, the cold-flow properties and low cohesion of the plastic sealant material 30 render it unsatisfactory as a bonding agent or cement although it is an excellent sealant. The epoxy material 32 at the outermost joints between the casing body 10 and the cover 12 is an excellent cement and absorbs substantially all of the stress which may be applied to the battery during handling thereof over the period of its life. However, a very thin film is employed and thus the epoxy cannot be fully relied upon to form a seal against migration of electrolyte or contaminants. With the strain on the plastic material thus relieved, the seal formed by said plastic material is maintained throughout the life of the battery.

The plastic sealant 30 may be of any of a wide variety of substances, provided that it is inert to battery acid, inexpensive, and pliant at ambient temperatures. A family of sealants heretofore known and used which are generally known in the art as "battery compounds" are generally well suited to the use. The preferred materials are asphaltic types which have melting points in the range of about 160° F. to about 500° F. The consistency or viscosity is not critical, as long as the material can be rendered fluid enough to be easily placed in the channels 28. Preferably the cover 12 is preheated at 250° F. for three to five minutes to maintain the sealant in a more plastic or fluid state until after it is applied to the channels 28 and the cover 12 can be assembled with the casing body 10. The cover may be used at temperatures in the normal range of room temperatures, but it is preferable to preheat the cover to temperatures in the range of 100° F. to 300° F. This does not prevent the thermoplastic material from becoming quite stiff a few minutes after the casing is assembled, however. The plastic sealant material may be conveniently extruded into the channels 28 by use of caulking gun or the like.

The amount of epoxy 32 is not highly critical, but should be enough to completely fill the space between the edge 35 of the peripheral wall 33 of the cover, and the ledge 34, which are spaced apart as illustrated in FIG. 3 after assembly of the casing. The amount should also be minimized for economic reasons and to avoid possible exudation from the joint. The epoxy cures at room temperature in about 10 to 12 hours and may be conveniently applied to the wall 14 by means of a roller which is run around the periphery of the wall 14 above the ledge 34, or on the ledge 34 itself. Alternatively, the epoxy may be extruded onto the ledge 34 by use of a caulking gun or the like. In still another method, the epoxy may be applied to the peripheral edge 35 of the cover 12 by dipping the same into a pan containing a shallow quantity of fluid epoxy. The edge 35 is constructed to extend further than the other parts of the cover 12 from the plane of the cover web 13, as illustrated in FIG. 1, so that the epoxy is applied only to the edge 35 by this process. The epoxy is preferably thickened with a commercial thickening agent to form a thixotropic non-running cement, and preferably has a viscosity between 6,000 and 10,000 centipoises at 75° F.

The amount of sealant and cement employed in a given battery construction will vary widely with the individual battery size, the casing and cover configuration, and perhaps the environment for ultimate use. However, it has been found that in the manufacture of a typical 12 volt automotive battery in accordance with this teaching, optimum results are obtained with a hot melt of asphaltic sealant in an amount within the range of about 20 grams to about 50 grams. About 30 grams of sealant have been found to produce the optimum seal. This amount would satisfy the desideratum of this invention where the total peripheral channel length is of the general order of 32 inches and the total intermediate channel length is of the general order of 32 inches. The channel width in such an example would be between about ⅛ and ⅙ inch.

In the specific embodiment described above, the amount of epoxy resin cement applied to the ledge 34 is preferably in the range of about 1 gram to about 5 grams. The preferred amount for optimum operation is about 2 grams. Thus, optimum results are obtained where the ratio of total asphaltic sealant to total cement is in the order of about 15 parts to 1 by weight and where the ratio of sealant to cement in a given unit length of the peripheral channel is in the order of about 7 or 8 to 1 by weight. It will be obvious that acceptable casing assemblies may be produced even though departing substantially from the foregoing optimum values.

The present invention has been described with such particularity as to enable others skilled in the art to make and use the same, and, by applying current knowledge, to adapt the same for various conditions of service without departing from the essential features of novelty involved which are intended to be defined and secured by the appended claims:

What is claimed is:

1. A casing for a battery comprising a casing body member and a casing cover member, one of said members having channel means comprising an outer peripheral wall to receive an edge portion of the other member, said other member having walls with an edge of reduced thickness, thereby defining a laterally extending ledge, a plastic sealant which remains pliable at ambient temperatures disposed within said channel means and forming a substantially liquid-impervious seal between said channel means and said edge of said other member, and a relatively rigid setting cement disposed between said ledge and said peripheral wall of said channel means to form a substantially rigid continuous smooth and tenacious bond therebetween.

2. The casing according to claim 1, wherein said channel means is on said cover member and said edge portion is on said body member.

3. The casing according to claim 2, wherein said body member defines a cavity, a plurality of intermediate wall means dividing said cavity into a plurality of compartments, and said cover member having channel means to receive upper edge portions of said intermediate wall means, and said plastic sealant forming a substantially liquid-impervious seal between said channel means and said upper edge portions of said intermediate wall means.

4. The subject matter of claim 1, wherein said plastic sealant is an asphaltic compound and said cement is an epoxy resin.

5. The casing of claim 4, wherein the ratio of asphaltic compound to epoxy resin is within the range of about 50 parts by weight asphaltic compound to about 4 parts by weight asphaltic compound to 1 part by weight epoxy resin.

References Cited by the Examiner

UNITED STATES PATENTS

| | | | |
|---|---|---|---|
| 2,692,907 | 10/1954 | Wallace | 136—170.1 |
| 2,890,262 | 6/1959 | Kendall et al. | 136—170 |
| 2,942,055 | 6/1960 | Doyle et al. | 136—170 X |

WINSTON A. DOUGLAS, *Primary Examiner.*

D. L. WALTON, *Assistant Examiner.*